United States Patent [19]

Bizilia

[11] 3,926,212
[45] Dec. 16, 1975

[54] SIGNAL VALVE
[75] Inventor: Paul K. Bizilia, Sayre, Pa.
[73] Assignee: Ingersoll-Rand Company, Woodcliff Lake, N.J.
[22] Filed: Jan. 16, 1975
[21] Appl. No.: 541,520

[52] U.S. Cl. .................... 137/495; 137/551; 116/73
[51] Int. Cl.² .......................................... F16K 37/00
[58] Field of Search ...... 137/495, 551, 557, 624.27; 116/1, 65, 115, 125, 73, 142 FP; 73/419

[56] References Cited
UNITED STATES PATENTS

| | | | |
|---|---|---|---|
| 1,862,086 | 6/1932 | Hueber | 116/142 FP |
| 3,127,867 | 4/1964 | Bochan | 116/73 X |
| 3,145,736 | 8/1964 | Gheen | 137/624.27 X |
| 3,474,906 | 10/1969 | Tennis | 137/557 X |

Primary Examiner—Martin P. Schwadron
Assistant Examiner—Robert J. Miller
Attorney, Agent, or Firm—Walter C. Vliet

[57] ABSTRACT

This invention relates to a mechanically actuated pneumatic valve used to measure the start of rotation of a re-torquing motor and which will measure or detect motion regardless of the starting point by means of a loss motion device. The normally closed valve will give a full line pressure pneumatic signal.

10 Claims, 2 Drawing Figures

SIGNAL VALVE

BACKGROUND OF THE INVENTION

In multiple wrench torquing tools typical of those utilized in the automotive industry for torquing of engine heads, connecting rods or wheel lugs, a problem arises where the initial fastener to tighten subsequently requires re-torquing after all of the fasteners have become tightened. A solution to this problem has been the development of re-torquing tools which will re-tighten the fastener to its initial torque level on a continuing basis. There was no way inherent in the tool to tell when the re-torquing cycle started. Since the re-torquing tool never stalls, a method to determine when the re-torquing cycle had started and to provide an air signal to shut off the unit ultimately through some means as a delayed selenoid valve was required.

Since the re-torquing tool could start in any position, it was necessary to devise a means capable of detecting motion regardless of the starting point. It was also desirable to have a full line pressure pneumatic signal to facilitate the control purposes.

SUMMARY

It is the principle object of this invention to provide a simple, mechanically actuated, normally closed valve with a form of loss motion which will measure or detect motion regardless of the starting point and give a full line pneumatic signal.

It is another object of this invention to provide a compact, reliable, easily installed and readily serviceable signal valve suitable for use on commercial re-torquing tools. It is another object of this invention to provide a simple mechanically actuated, normally closed valve with a form of loss motion which is capable of detecting mechanical motion regardless of the starting point and give full line pneumatic signals for control purposes.

In general, the foregoing and other objects are obtained by providing a signal valve for determining the initiation of movement of a part comprising: a valve body having a central bore; a pressure fluid inlet entering said bore; a pressure fluid outlet from said bore; a piston member disposed in said bore for displacement from a first position close to said inlet to a second position close to said outlet, to a third position beyond said outlet; said piston being disposed between said inlet and outlet in both the first and second positions to seal the pressure fluid from the outlet; stop means to prevent said piston from displacement beyond the second position once pressure fluid is applied to said inlet, and displacement means operable only after said piston is in said second position and in response to a motion to be sensed to displace said stop means and allow said piston to move to said third position wherein said outlet communicates with said inlet creating a pressure fluid signal at said outlet.

BRIEF DESCRIPTION OF THE DRAWINGS

The invention will be described in conection with the annexed drawings wherein.

DESCRIPTION OF THE PREFERRED EMBODIMENT

Figure 1:
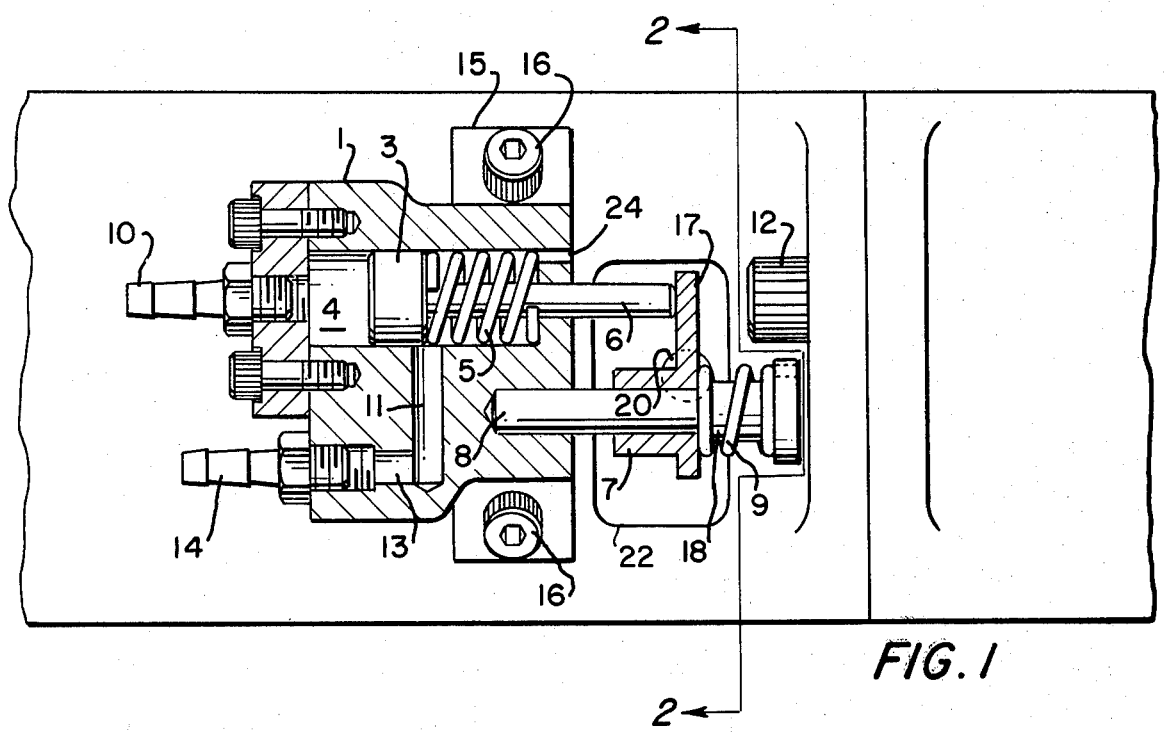
FIG. 1 is a sectional view of the signal valve showing the components of this invention.

The body of the signal valve is shown generally by reference number 1. The body contains a pneumatic piston 3 housed within a chamber 4 within the body of the valve. The piston 3 is urged to a first position by a spring 5 within the chamber 4. Piston 3 operates an actuating plunger 6 which is capable of translating sear 7 in the direction away from the first position. Sear 7 is mounted on mounting shaft 8 in such a manner that it is capable of both rotary and translatory motion. Sear 7 is also urged towards the first position by compression and torsional spring 9 which also indexes the sear to a position of engagement with actuating plunger 6.

Air enters chamber 4 by way of inlet 10. Outlet 11 is provided to chamber 4 at a point on the opposite side of piston 3 from inlet port 10 when piston 3 is in the first position. A vent port 24 is provided in chamber 4 to vent chamber 4 upon movement of the piston from the first position to subsequent positions. A stop 12 is provided to limit the axial movement of actuating plunger 6 and hence, piston 3 away from the first position. Passage 13 communicates between the outlet port 11 and external connection 14.

Figure 2:
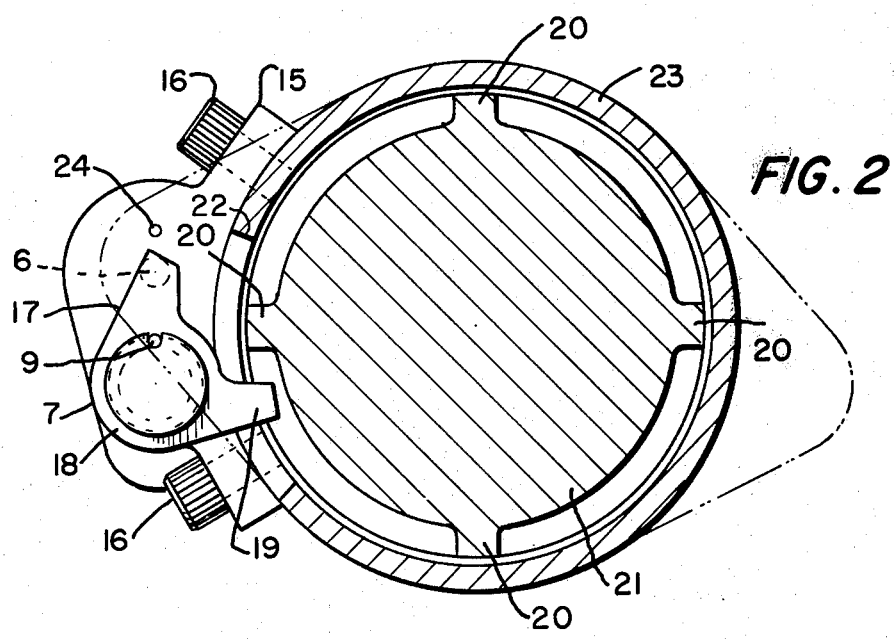
FIG. 2 is an end view of the signal valve taken at plane 2—2 shown on FIG. 1.

The signal valve is mounted by means of flange 15 and mounting bolts 16. Sear 7 has the general form of a bell crank (shown in FIG. 2). One arm 17 serves to intercept actuating plunger 6 to limit its travel from the first position to the extent of travel in the axial direction permitted by the sear 7 as determined by sear stop 18 which is formed by an enlarged diameter portion of mounting shaft 8. The other arm 19 of sear 7 serves to engage motion indicating lugs 20 attached to the re-torquing motor case 21. Sear arm 19 engages the lugs 20 only after sear 7 has been translated to its second position against stop 18. Sear arm 19 engages the lugs 20 through a window 22 provided in the outer wrench case 23.

In operation, the signal valve is armed by applying pneumatic pressure to inlet port 10. The pressure in chamber 4 causes piston 3 to move from the extreme left position in the chamber to the position shown in FIG. 1. The piston, in turn, causes actuating plunger 6 and sear 7 to move to the right as determined by the sear stop 18. Air trapped behind piston 3 is allowed to vent via vent port 24. Vent port 24 however, remains isolated from inlet port 10. In this position arm 19 of sear 7 is capable of engaging lugs 20 of motor 21 which will rotate upon the start of the re-torquing cycle. When motor 21 begins to rotate within outer wrench casing 23 contact of lugs 20 with sear arm 19 will cause sear 7 to be rotated about mounting shaft 8 causing sear arm 17 to lose engagement with actuating plunger 6 and thereby allowing piston 3 with plunger 6 to advance to a third position to the right as limited by stop 12. In this position inlet port 10 communicates directly with outlet port 11 creating a pressure signal at external connection 14.

This signal is utilized to actuate a delayed selenoid valve (not shown) which in turn shuts down the re-torquing motor a specified period of time after re-torquing has started.

Once sear 7 losses engagement with actuating plunger 6 it returns to the first position under the influence of spring 9, however, it is rotated out of its initial position by contact with the side of actuating plunger 6. In this position it can no longer engage the lugs 20 and does not oppose the plunger 6. When the re-torquing cycle has been completed, pressure fluid is removed from inlet port 10. Piston 3 along with actuating plunger 6 is returned to the extreme right position under the influence of spring 5 and sear 7 is rotated counter-clockwise into engagement with actuating plunger 6 under the influence of torsion from spring 9. In this position the signal valve is ready to repeat the above cycles.

It should be obvious to one skilled in the art that the above described signal valve, as a result of the forward and rearward motion of the sear 7, will not give a premature shut off signal should the motor rotate for any reason prior to the arming of the signal valve and the start of the re-torquing cycle. In addition, the signal line is bled off through vent port 24 at any time when the piston 3 is in the first or second position. This is an important feature especially when these valves are used in series. It should also be obvious to one skilled in the art that the valve can be utilized at any fluid pressure capable of moving the actuating plunger 6 against spring 5 and sear spring 9.

Although the invention has been described in the preferred embodiment for use as a re-torquing signal valve, it should be, obvious to one skilled in the art that such a valve may be used to create a signal upon any mechanical movement either rotary or linear after the arming event has occurred.

Although the preferred embodiment of the invention has been shown and described in detail, it should be understood that the invention is not limited thereto, except by the scope of the claims. Various modifications and changes can be made without departing from the scope and spirit of the invention as the same will now be understood by those skilled in the art.

I claim:

1. A signal valve for determining the initiation of movement of a part comprising:
   a valve body having a central bore;
   a pressure fluid inlet entering said bore;
   a pressure fluid outlet from said bore;
   a piston member disposed in said bore for displacement from a first position close to said inlet to a second position close to said outlet, to a third position beyond said outlet;
   said piston being disposed between said inlet and outlet in both the first and second positions to seal the pressure fluid from the outlet;
   intercept means to prevent said piston from displacement beyond the second position once pressure fluid is applied to said inlet;
   displacement means operable only after said piston is in said second position and in response to a motion to be sensed to displace said intercept means and allow said piston to move to said third position; and
   signal means responsive to said piston moving to said third position.

2. Signal valve according to claim 1 wherein:
   said stop means is moved to a position of engagement with said displacement means by said piston moving from said first to said second position.

3. A signal valve according to claim 2 wherein:
   said stop means is a lever means.

4. A signal valve according to claim 3 wherein:
   said lever means is mounted to rotate in a plane perpendicular to the axial movement of said piston and parallel to the direction of movement to be sensed.

5. A signal valve according to claim 2 wherein:
   said piston moves said stop means through an actuating plunger which in turn restrains the movement of said piston in both said second and said third positions.

6. A signal valve according to claim 1 wherein:
   said displacement means is a raised projection on the moving part.

7. A signal valve according to claim 4 wherein:
   said lever is a pivotal bell crank having one of its arms acting as a piston stop and the other arms as a means of intercepting said displacement means when said lever is moved axially along its pivot to said second position.

8. A signal valve according to claim 7 wherein:
   said one arm of said lever is in operable contact with said piston and whereby said piston can move said lever to the second position and whereby said piston is restrained by said one arm of said lever until such time as said displacement means contacts said other arm causing said lever to rotate about its pivot point and thereby release said piston to further travel.

9. A signal valve according to claim 8 wherein:
   said lever is urged to its first position both axially and rotationally by a combination torsion and compression spring and said piston is urged to its first position by a compression spring once pressure fluid is removed from said inlet and whereby the valve is reset to its neutral starting position.

10. A re-torquing motor signal valve for determination of the initiation of the movement of re-torquing motors comprising:
    a valve body having a central bore;
    a pressure fluid inlet entering said bore at one end;
    a pressure fluid outlet from said bore existing between said one end and another end of said bore;
    a sealing and operating piston disposed in said bore for displacement from a first neutral position close to said inlet to a second armed position close to said outlet, to a third signal position beyond said outlet;
    said piston being disposed between said inlet and said outlet in both said first and second positions to seal the pressure fluid from said outlet;
    an actuating plunger extending from said piston in an axial direction towards said third operating position;
    a sear mounted to rotate in a plane perpendicular to the axial movement of said piston and said actuating plunger and parallel to the direction of motor movement to be sensed;
    said sear being movable by said plunger in an axial direction from a first neutral position to a second armed position whereupon said sear contacts a stop means which limits further axial movement of said plunger and said piston;
    said sear having a first arm in operable contact with said plunger in both the first and second position;
    said sear having another arm which is disposed in a position to be contacted by said motor upon rotation of said motor; and
    the contact of said motor causing said sear to be rotated to the extent that said first arm no longer contacts said plunger and whereby the plunger and piston are free to move to a third operating position where the piston is beyond said outlet and thereby exposing said outlet to pressure fluid to create a signal.

* * * * *